United States Patent [19]

Aldrich et al.

[11] 4,158,742
[45] Jun. 19, 1979

[54] GENERAL PURPOSE ROCKET FURNACE

[75] Inventors: Billy R. Aldrich, Huntsville; William D. Whitt, Toney, both of Ala.

[73] Assignee: The United States of America as represented by the Administrator of the National Aeronautics and Space Administration, Washington, D.C.

[21] Appl. No.: 746,578

[22] Filed: Nov. 30, 1976

[51] Int. Cl.² .............................................. H05B 3/00
[52] U.S. Cl. ........................................ 13/20; 13/22; 13/24; 219/410
[58] Field of Search .................... 13/31, 20, 22, 24; 219/406, 410, 428

[56] References Cited

U.S. PATENT DOCUMENTS

| 3,427,011 | 2/1969 | Boyer et al. | 13/31 X |
| 3,736,360 | 5/1973 | Bergman et al. | 13/24 |

Primary Examiner—R. N. Envall, Jr.
Attorney, Agent, or Firm—George J. Porter; John R. Manning; L. D. Wofford, Jr.

[57] ABSTRACT

A multi-purpose furnace for space vehicles used for material processing experiments in an outer space environment. The furnace contains three separate cavities designed to process samples of the widest possible range of materials and thermal requirements. Each cavity contains three heating elements capable of independent function under the direction of an automatic and programmable control system. A heat removable mechanism is also provided for each cavity which operates in conjunction with the control system for establishing an isothermally heated cavity or a wide range of thermal gradients and cool down rates. A monitoring system compatible with the rocket telemetry provides furnace performance and sample growth rate data throughout the processing cycle.

22 Claims, 16 Drawing Figures

FIG. 3. THERMAL PROFILE ENVELOPE FOR MULTIPURPOSE FURNACE

FIG. 4. MAXIMUM THERMAL GRADIENT Vs. CRUCIBLE HOT END TEMPERATURE

FIG. 5. MAX. FURNACE COOL DOWN RATE Vs. CRUCIBLE HOT END TEMP. AND RAMP GENERATOR CALIBRATION

GENERAL PURPOSE ROCKET FURNACE

ORIGIN OF THE INVENTION

The invention described herein was made by employees of the United States Government and may be manufactured and used by, or for, the Government for governmental purposes without the payment of any royalties thereon or therefor.

FIELD OF THE INVENTION

The present invention relates to furnaces which establish a thermal gradient and has particular utility in performing materials processing experiments in the zero gravity environment of outer space.

BACKGROUND OF THE INVENTION

Laboratory or industrial type furnaces which are inherently designed for use on the ground cannot be simply modified for adoption for use in space. Restraints on these ground furnaces are imposed by the host vehicle, such as minimum size and weight, power availability, mechanical loading and other safety considerations. The known prior art of utilizing furnaces in space processing facilities has been limited in the amount of thermal control and sample process functions they offer. The furnace systems used on the Skylab were limited to heating a sample on one end and passively cooling it on the other end. Additionally, these furnaces were limited in their processing functions by having only one heating zone, i.e., having all furnace cavities heated to the same temperature with the same heating element. This requires the furnace to process the same experiment in all three cavities. Furthermore, since these furnace systems were passively cooled, they did not provide any active coolant agent such as a gas or liquid.

Representative of these prior art furnaces is U.S. Pat. No. 3,647,924 issued to John R. Rasquin for a high temperature furnace for melting materials in space. While this furnace has been designed for its use in the vacuum and zero gravity environment of outer space, it only contains one cavity with one heating element and does not utilize an automatic control system capable of remotely monitoring the experiment sample through various processing stages. Furthermore, the furnace of Rasquin is not designed to withstand rocket lift-off vibration loads as high as 30 G. Additionally, since Rasquin contains only a single heating element, it is not capable of establishing a thermal gradient and therefore its experimental capacities are much more limited than those capable in the present invention.

Other prior art patents relating either to furnaces in general, or heating in outer space, are U.S. Pat. Nos. 2,345,181; 2,647,826; 2,850,597; 2,944,500; 3,171,346; 3,548,062; 3,736,360; 3,737,553 and 3,860,222. The majority of these references relate to industrial heaters which are designed in such a manner that they could not be used aboard an outer space vehicle. For the most part, these inventions require at least a 110 volt AC power supply to furnish the power for the furnace operation and control. This required power is much too great to be supplied by the power supply on the rocket. The furnace of the present invention is designed to be as light as possible, as small as possible and require minimum power along with withstanding a wide range of vibration, acceleration and shock loads both at room temperature and at a maximum operating temperature. The referenced prior art inventions cannot be modified or designed to withstand these vibrations and be used on an inflight rocket.

SUMMARY OF THE INVENTION

The present invention relates to a multi-purpose furnace for space vehicles used for material processing experiments in an outer space environment. The furnace contains three separate cavities designed to process samples of the widest possible range of materials and thermal requirements. Each cavity contains three heating elements capable of independent function under the direction of an automatic and programmable control system. A heat removal mechanism is used to extract the excess heat build-up in each heating module and operates in conjunction with the control system for establishing an isothermally heated cavity or a wide range of thermal gradients and cool down rates. A monitoring system compatible with the rocket telemetry provides furnace performance and sample growth data throughout the cycle.

The processing facility is mechanically and thermally designed to withstand rocket vibration and shock loads encountered during launch and recovery and will be capable of withstanding these loads at operating temperatures repeatedly without significant damage. The short processing time (approximately 5-7 minutes) made available by these research rockets can be utilized by taking advantage of the relatively fast growth rate associated with large temperature gradients and a near zero "G" environment. Additionally longer processing times can be utilized during orbital space flight. Experiments involving the solidification of pure materials, alloys, composites, glasses and electronic materials can be conducted using the multipurpose furnace of the present invention.

The above-described invention will be better understood from the following detailed description when considered in connection with the accompanying drawings.

DETAILED DESCRIPTION OF A PREFERRED EMBODIMENT

Figure 1:
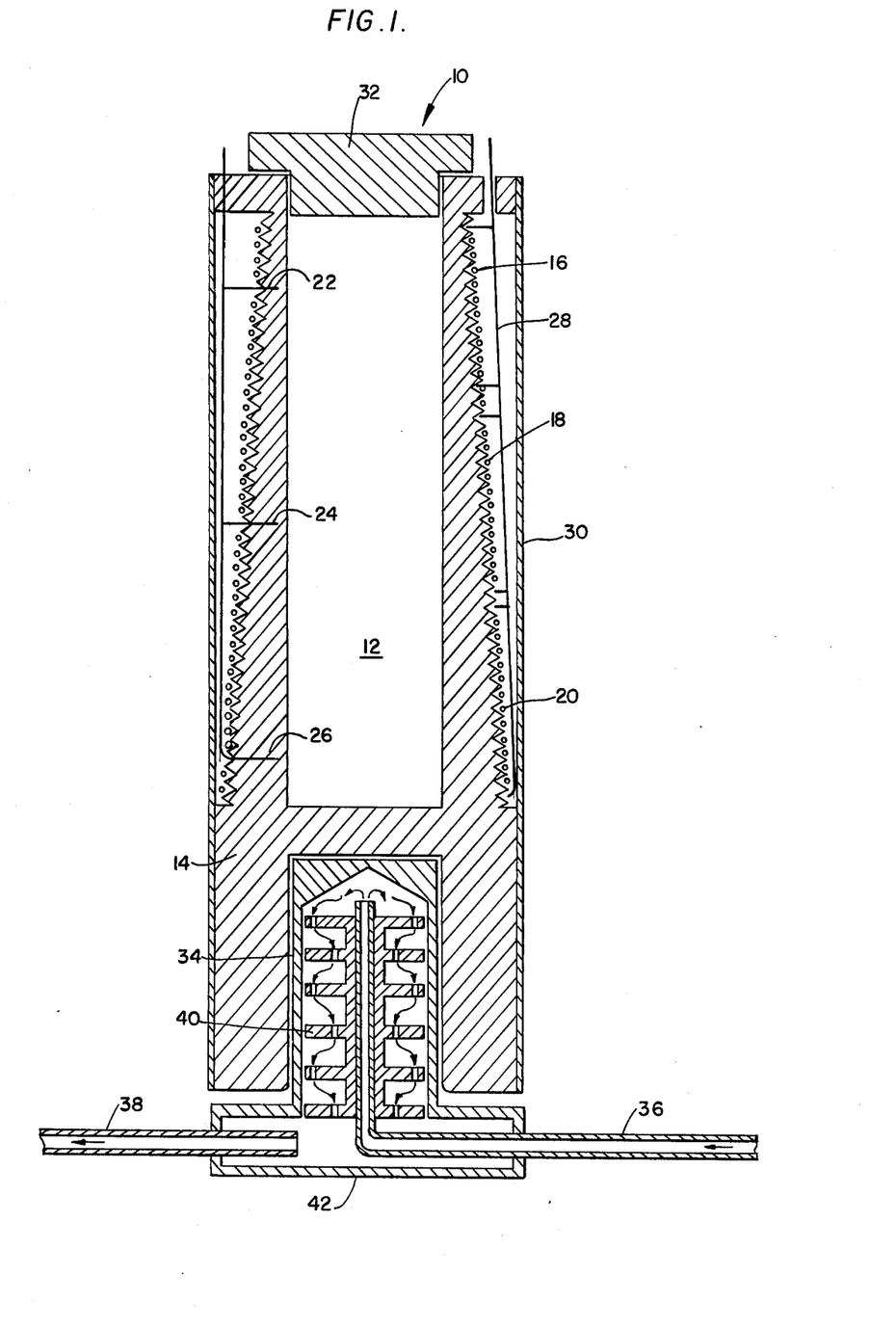
FIG. 1 is a schematic drawing of a single heating module containing three heating elements.
Figure 2:
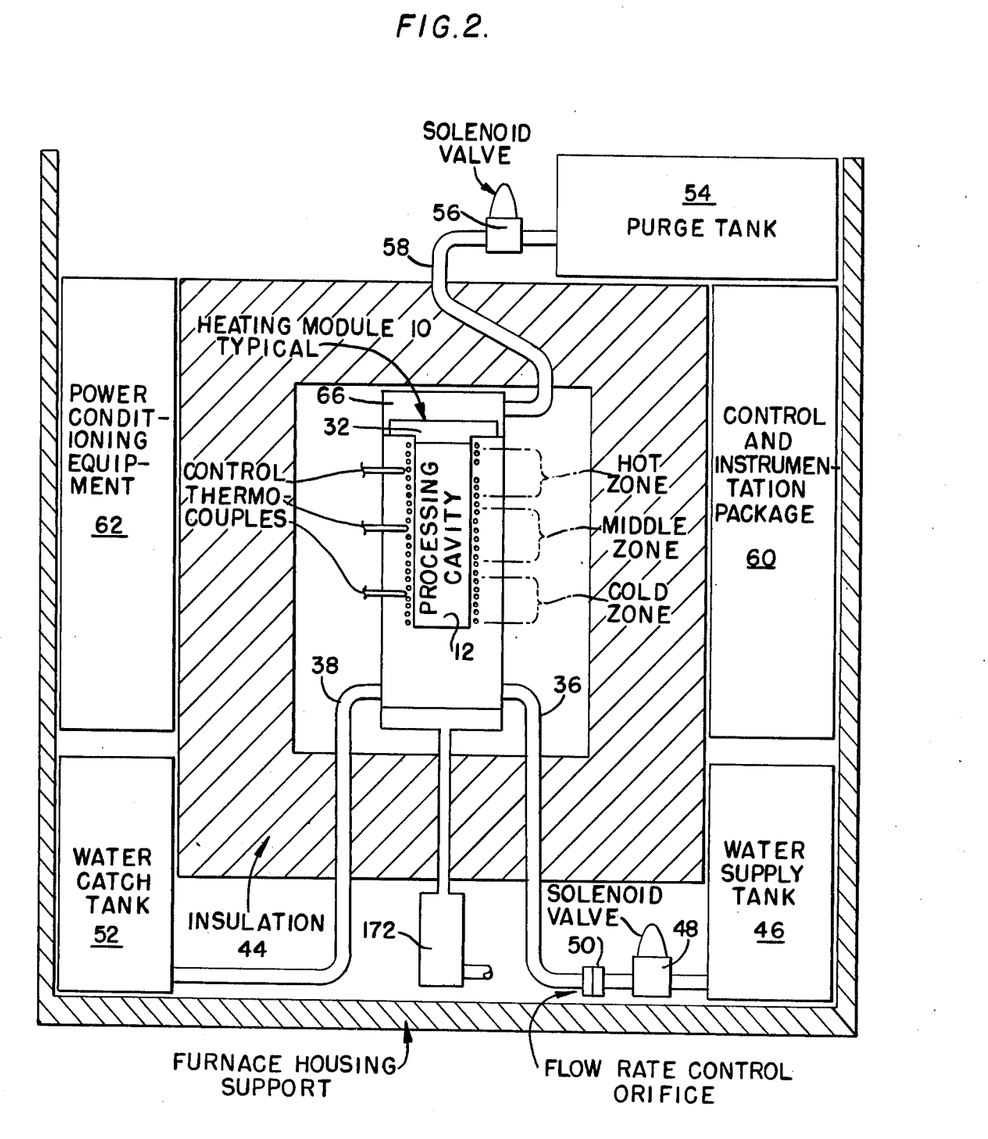
FIG. 2 is a schematic drawing of the multipurpose furnace showing one heating module.

The mechanical and thermal design of the three-cavity furnace with provisions for temperature monitoring, directional cooling, rapid iosthermal quenching and establishing thermal gradients are shown schematically in FIGS. 1 and 2. FIG. 1 shows a single gradient heating cavity and FIG. 2 shows the relationship between this heating cavity and the distinct control mechanisms, including control and instrumentation package 60 and power conditioning equipment 62.

FIG. 2 shows only a single heating cavity used primarily for gradient heating. It can be appreciated that the two other cavities are linked to the control mechanisms in a similar manner. Each of the three heating modules 10 are constructed of graphite 14 and are placed within a sealed stainless steel cavity 66. Each of the modules 10 utilize a cone-like graphite configuration (as shown in FIG. 1) employing a lesser amount of graphite thereby eliminating excess weight. Each module contains a material processing cavity 12 which has a diameter of approximately 2.1 cm and is 8 cm long. A removable graphite end cap 32 is placed upon one end of the cavity 12 thereby allowing the introduction therein of a sample material. Each heating module contains three independently controllable resistance heating elements 16, 18 and 20. As shown in FIGS. 1 and 2, these heating elements allow different sections of the processing cavity 12 to be heated to different temperatures as denoted by the hot zone, middle zone and cold zone shown in FIG. 2. The use of Inconel, platiimum, ceramic or any one of several resistance heating materials, in an inert gas or vacuum atmosphere as the heating element is used to achieve an operating temperature of up to 2000° C. These elements are linked to the control and instrumentation package 60 by a heating element lead wire 28, and controls the temperature in the cavity 12 in a manner that will be subsequently explained.

The temperature in each section of the materials processing cavity 12 is monitored by a plurality of thermocouples 22, 24 and 26. Thermocouple 22 monitors the temperature in the hot zone, thermocouple 24 monitors the temperature in the middle zone and thermocouple 26 monitors the temperature in the cold zone. These thermocouples are also connected to the control and instrumentation package 60 so that a desired temperature may be maintained in each and every section of all three heating modules.

Since an important feature of the present invention is to establish a wide range of thermal gradients, a liquid heat sink means must be provided for removing the thermal energy from the cold end of the heated module, making it possible to establish these gradients. For this purpose, cooling water is supplied by a water supply tank 46 through flow tubes 36 into each heating module. Water flows into a stainless steel water jacket 34 contained inside the graphite crucible and around a plurality of baffles 40, for transferring the heat from the graphite crucible to the water. The water then flows into a chamber 42 and is exited from the heating module through flow tube 38 into a water catch tank 52. The rate of flow of this water is controlled by a solenoid valve 48 and a flow rate control orifice 50.

In order to reduce the resultant change in momemtum, and its effect on the experiment, caused by the water flowing from the supply tanks 46 to the catch tanks 52, three supply tanks and three catch tanks (one of each for every heating module) are placed alternately around the perimeter of the furnace package supported by furnace housing 64. The water tanks are placed at the same elevation to eliminate longitudinal accelerations.

As shown in FIG. 2, each heating module is placed into a sealed stainless steel cavity 66. If required, this cavity can be flushed with helium gas contained in a plurality of purge tanks 54 to achieve a rapid isothermal cool down of the three heated modules. The rate of flow of this gas is controlled by a solenoid valve 56 with the gas flowing into the cavity through conduit 58. Cavity 66 is surrounded by an efficient fiberous insulating material 44 (see FIG. 2) to provide a greater temperature gradient between the three heated modules, if each of the modules are required to operate at different temperatures. This insulation can be varied according to the process need. For example, if an isothermal cool down of each module is envisioned, cooling helium gas would be allowed to pass through the heated area enclosed by a radiation shield 31.

An electrical system which monitors and controls the heating and cooling of each of the three heating modules is contained in the control instrumentation package 60, powered by the power conditioning equipment 62. This control system allows each of the nine heating elements to be set to its required temperature from 0°–1200° C., 0°–1600° C. or 1000°–2000° C., by adjusting individual control potentiometers. Separate control potentiometers can be set to obtain a required temperature hold. This hold time or soak period can be set for any length of time, referenced to lift off, from 0–10 minutes. Longer times can be set for orbital flights. A cool down potentiometer can be set to reduce the three heating elements linearity over a range of 0°–60° C. per minute.

When the control potentiometers are set, the furnace system can be initiated to automatically heat three experiment samples, hold them at specified temperatures for required periods of time and cool each heated module down at specified solidification rates.

As indicated previously, graphite is used as the heating module core. Double lead grooves, for the heating element wire, are cut in the graphite core. These thread grooves are then covered with a 0.010-inch thick coat of flame sprayed alumina. Each heating element is then would across the heated zone and back on the double lead grooves. This double wound heating element eliminates electro-magnetic fields that might be harmful to the processing materials. After the heating elements, lead-out wires and thermocouples are placed in the graphite core, the entire area is coated with approximately 0.030 inches of alumina.

Figure 15:
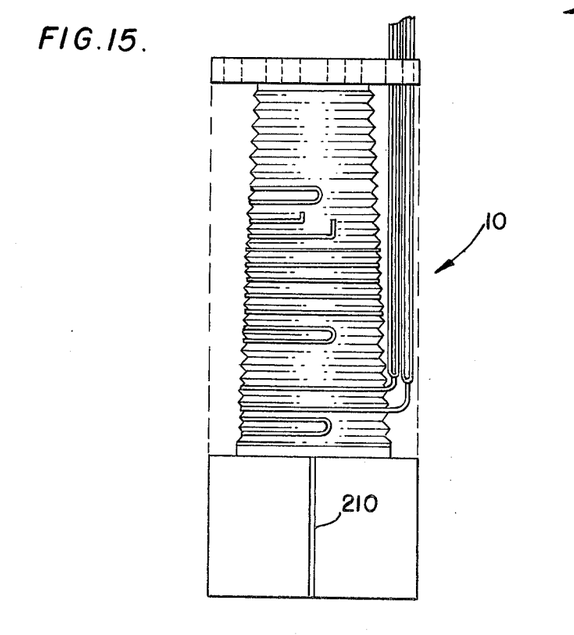
FIG. 15 is a view of a gradient heating module showing the expansion joint.

In order to eliminate the problems encountered in establishing large thermal gradients at lower temperatures, the nickel-plated stainless steel water jacket 34 is inserted inside of the graphite crucible as shown in FIG. 1. The water jacket is placed at the end of the heater opposite the materials processing cavity. The graphite cylinder housing the water jacket is slotted by an expansion slot 210 of approximately 0.01 inches (see FIG. 15) to allow the graphite cylinder to spring open when the stainless steel water jacket becomes larger due to thermal expansion. This expansion presses the water jacket against the inside of the graphite cylinder thereby providing thermal conduction as well as radiation heat transfer.

Figure 14:
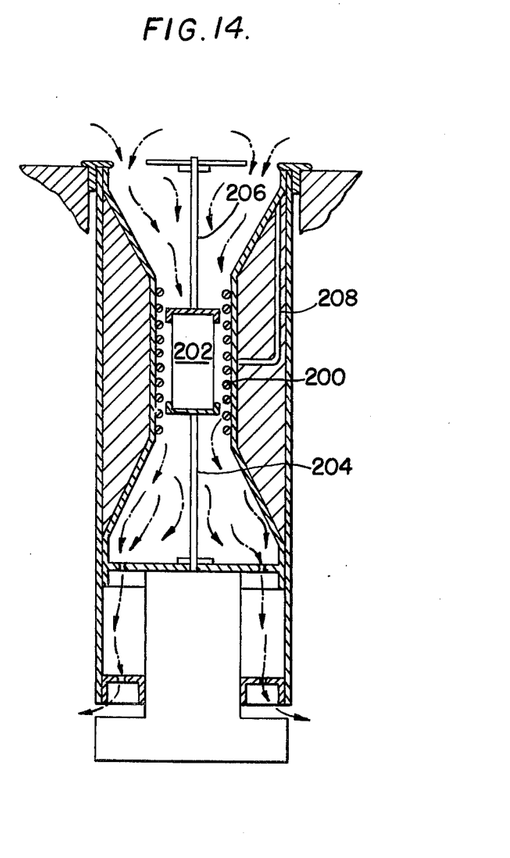
FIG. 14 is a schematic drawing of an isothermal heating module containing one heating element.

FIG. 14 shows a schematic drawing of an isothermal heating module constructed of graphite and containing a single heating element 200. The experiment sample is contained in an experiment cartridge 202 positioned between an experiment cartridge stand-off 204 and an experiment removal rod and stand-off 206. A thermocouple 208 is used to measure the temperature of the interior of the heating module. The heating element 200 and the thermocouple 208 are connected to the control circuitry in a manner similar to that of the gradient heating module. The arrows show the passage of the helium gas around the heating module to achieve a rapid isothermal cool down.

Figure 3:
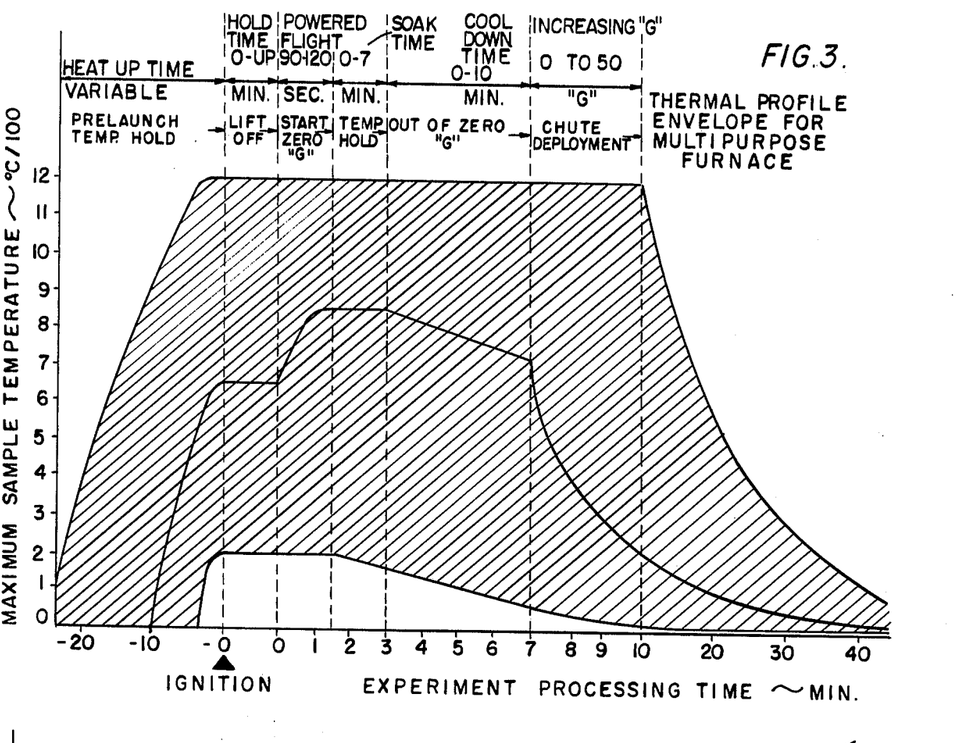
FIG. 3 is a graph of the thermal capability of the heated module.

The thermal profile envelope of the present invention is shown in FIG. 3. The curves shown in this figure were plotted from test data and show the thermal capability of the heated module using Kanthal A-1 heating element material. The dotted vertical lines indicate the different events that occur during the processing cycle. The cross hatched area represents the temperature and time capability of the heated module.

A typical flight experiment is shown plotted within the cross-hatched area. In this experiment, the sample is preheated to 650° C. and held for a period of time. At ignition, the sample is heated to its processing temperature of 850° C. during the powered flight. Upon entering zero "G" it is held for the required soak time. The experiment is then allowed to cool down according to the required solidification rate. The power is turned off after the experiment has solidified and is passing into the high "G" area. Any combination of heat-up rates, pre-launch hold, processing temperature, soak time and solidification rates can be used as long as they are within the cross-hatch area.

Figure 4:
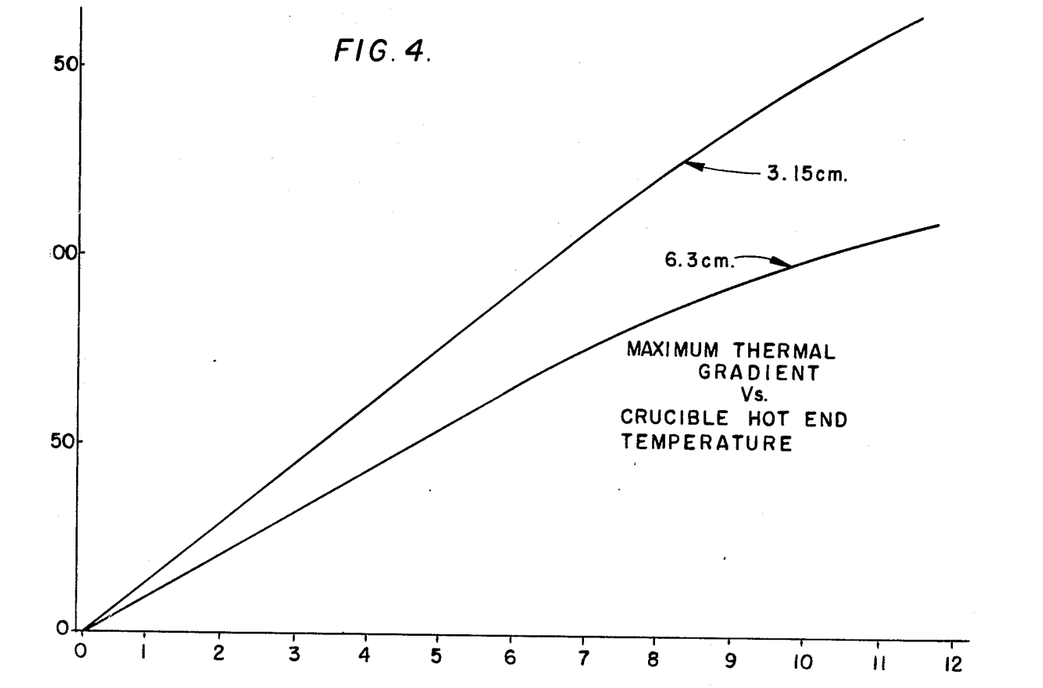
FIG. 4 is a graph of the maximum thermal gradient vs. the crucible hot end temperature.

In any furnace system, the maximum obtainable gradient is related to the operating temperature, thermal losses through the furnace insulation, and the ability to remove the heat energy from the cold end of the heated module. A curve of the maximum thermal gradient as related to the module hot end temperature as shown in FIG. 4. The thermal gradients plotted in the 6.3 cm curve were obtained by heating the hot and middle zones (see FIGS. 1 and 2) to the desired gradient maximum temperature and the cold zone to the minimum temperature. The minimum temperature was determined by varying the water flow rate through the cooling system in order to obtain a maximum cooling without over-riding the temperature controller. The thermocouples were placed 3.15 cm apart, making the distance between the hot zone and cold zone 6.30 cm, and the distance between the middle and cold zone 3.15 cm.

Figure 5:
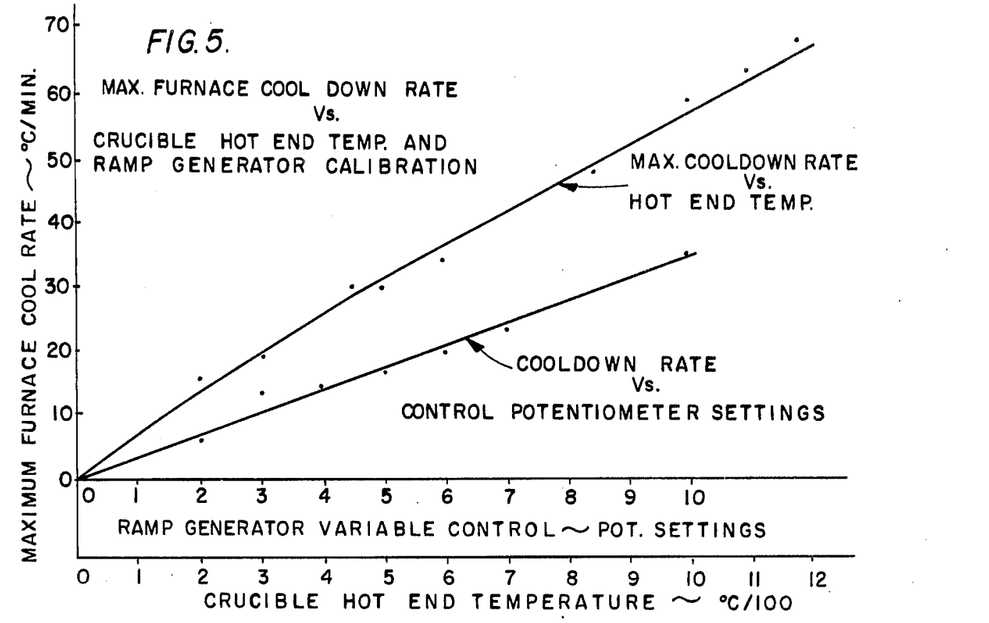
FIG. 5 is a graph of the maximum furnace cool down rate vs. crucible hot end temperature.
Figure 6:
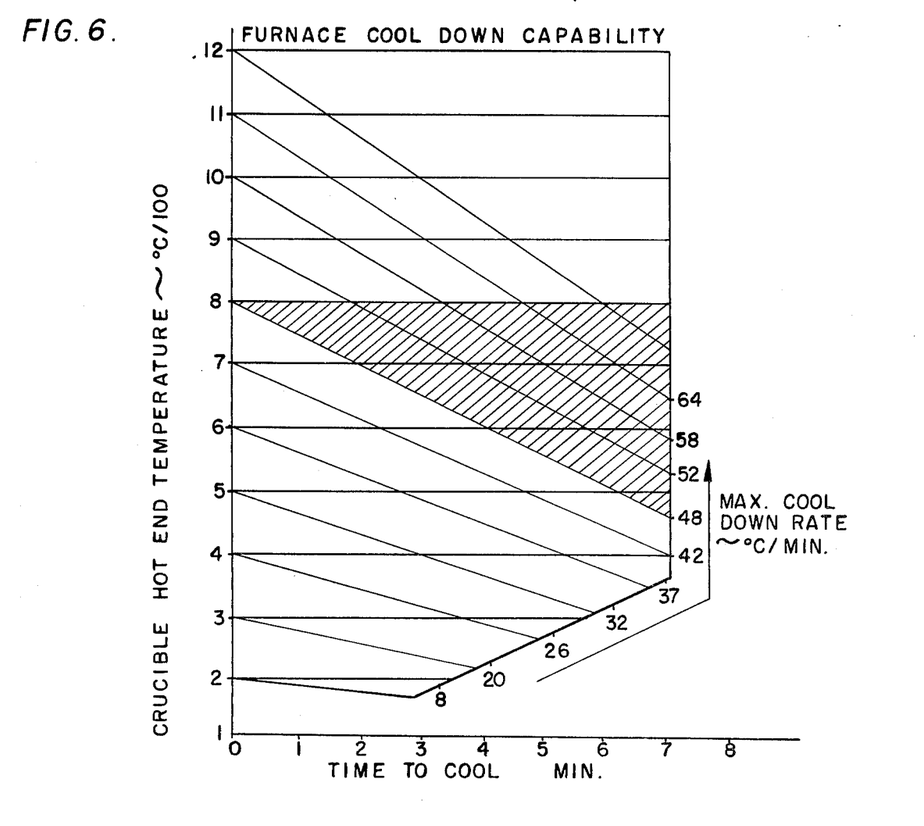
FIG. 6 is a graph of the furnace cool down capability.

The sample cool down rate is related to the operating temperature and the capacity of the system to remove thermal energy from the cold end of the heated module. A plot of the maximum furnace cool rate vs. the crucible hot end temperature is shown in FIG. 5. This curve indicates that the maximum cool down rate of the heating module at 1100° C. is 64° C./min. and decreases with temperature. FIG. 5 also shows a calibration curve indicating the relationship between the number of turns of the cool down control potentiometer and the cool down rate. FIG. 6 represents the variation in temperature reduction obtainable by the present unit. For example, if a sample were processed at 800° C., it would be cooled down according to the cross-hatched area in FIG. 6, from 0° C./min., represented by the horizontal line at 800° C., to a maximum of 48° C./min., represented by the diagonal line from 800° C. to 48° C./min.

The limited cool down times, at maximum cooling rates, shown in FIG. 6 for temperatures of 200°–600° C. is due to reaching the maximum heat removal capability of the system. Beyond this point, the cool down rate is no longer linear but rather follows the typical free cool exponential curve.

Figure 7:
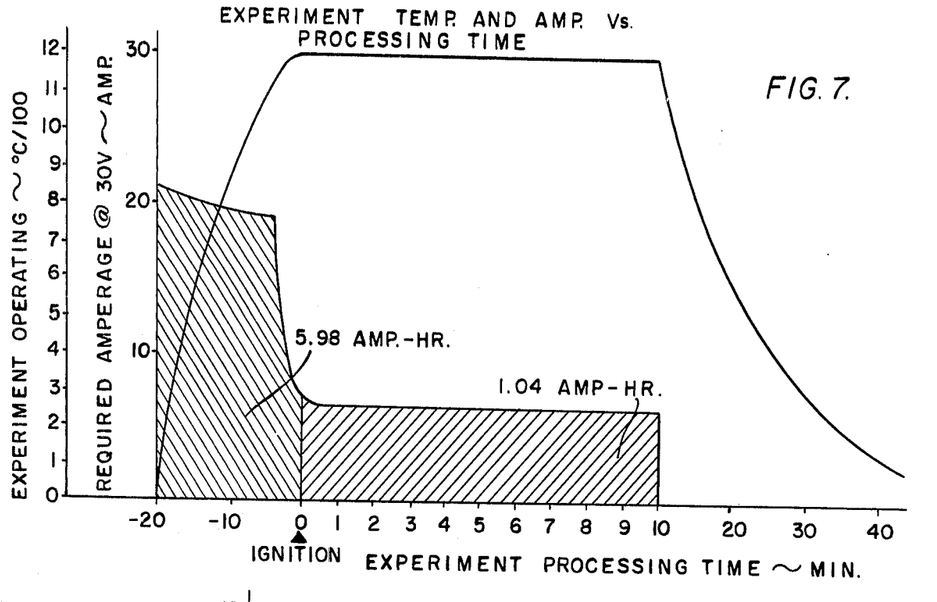
FIG. 7 is a graph of the maximum current required vs. experiment time.
Figure 8:
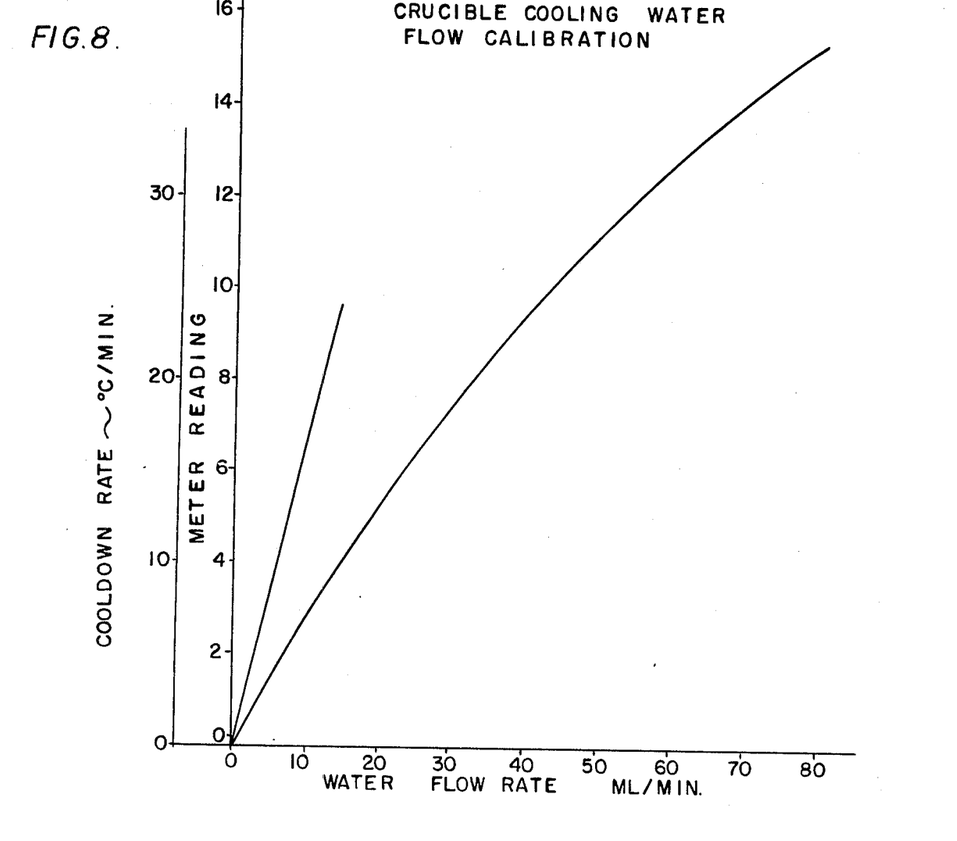
FIG. 8 is a graph of the crucible cooling water flow calibration.

The quantity of electricity required for this unit, when operating at maximum temperature is shown in FIG. 7. This graph indicates the maximum current required vs. experiment time. From this figure, the required flight battery ampere-hours can be determined. The greatest current demand occurs when the experiment is first turned on and decreases as the temperature increases. As the temperature approaches the set value, the power is reduced until steady state conditions exist. At this point, the controller is supplying enough power to equal the heat energy lost through the furnace insulation. According to FIG. 7, the furnace module requires approximately 6 ampere-hours to reach the maximum furnace temperature of 1200° C. and approximately one ampere-hour to hold this maximum temperature. Assuming that the experiment is preheated prior to launch, as indicated by FIG. 8, the 6 ampere-hours required will be provided by ground power supply. This leaves 1 ampere-hour to be supplied by the flight batteries.

The cooling water flow rate is regulated to provide the desired heat extraction from the furnace cavity. At any given temperature set point, the water is regulated to take a little more thermal energy out of the system than is necessary to establish the desired static thermal conditions. This allows the controller to put back into the system the excess heat taken out, and provide active thermal control.

The maximum water flow is determined to be approximately 70 ML/min. The amount of water required varies with the temperature gradient and cooling rates. An approximate flow rate required for increasing cool down rates from 0°–24° C./min. at an operating temperature of 800° C. is shown in FIG. 8. This figure also shows the flow meter calibration.

The furnace system including heater power and all control functions must operate on flight batteries or ground support power supplies within the range of 27–32 volts of direct current. It will withstand continuous operation on under voltage ranging from 21–27 volts or an over voltage ranging from between 32 and 35 volts without damage to the components and will give its specified performance upon return to the rated operating voltage.

Figure 9:
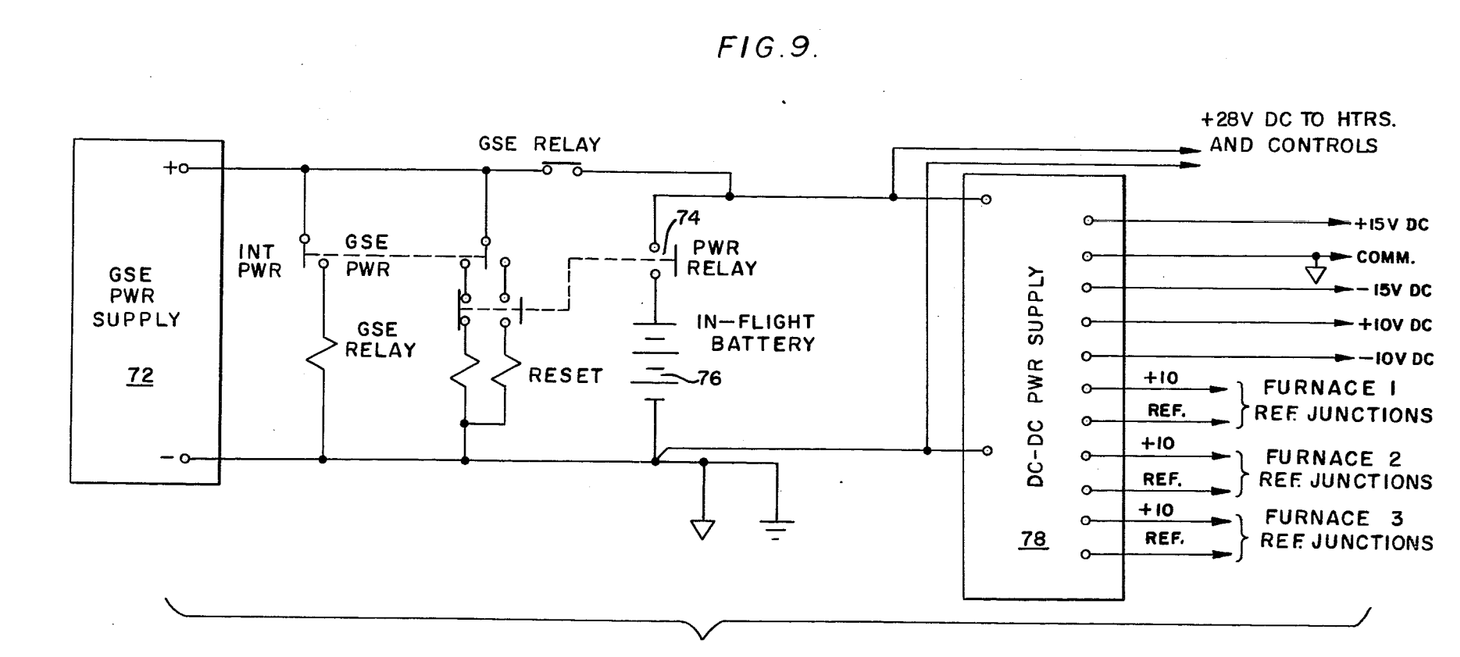
FIG. 9 is a circuit diagram of the power system of the present invention.

The power circuits 70 are shown in FIG. 9. A ground support power supply 72 is shown since the power to the heating modules is initiated while the rocket is still on the ground. This supply is connected to a power relay 74 and an in-flight battery 76, both located on a support module. Filtered regulated voltages are required for a stable operation of the electronic circuitry used in the control system. The raw battery voltage is converted to supply voltages for the solid state circuitry utilizing a combination switching and DC-DC inverter power supply 78, thereby isolating power supply 72 and in-flight battery 76 from the heater and controls.

The power supply shown in FIG. 9 powers all of the electronic and temperature control systems used in the furnace. These circuits provide power to each of the facilities nine heating elements. This power will be capable of raising and maintaining the hot, middle and bottom zones (see FIG. 2) to temperatures of room temperature to 1200° C. The power to each of the nine heating elements will be independently controllable over the temperature ranges stated above.

Figure 10A:
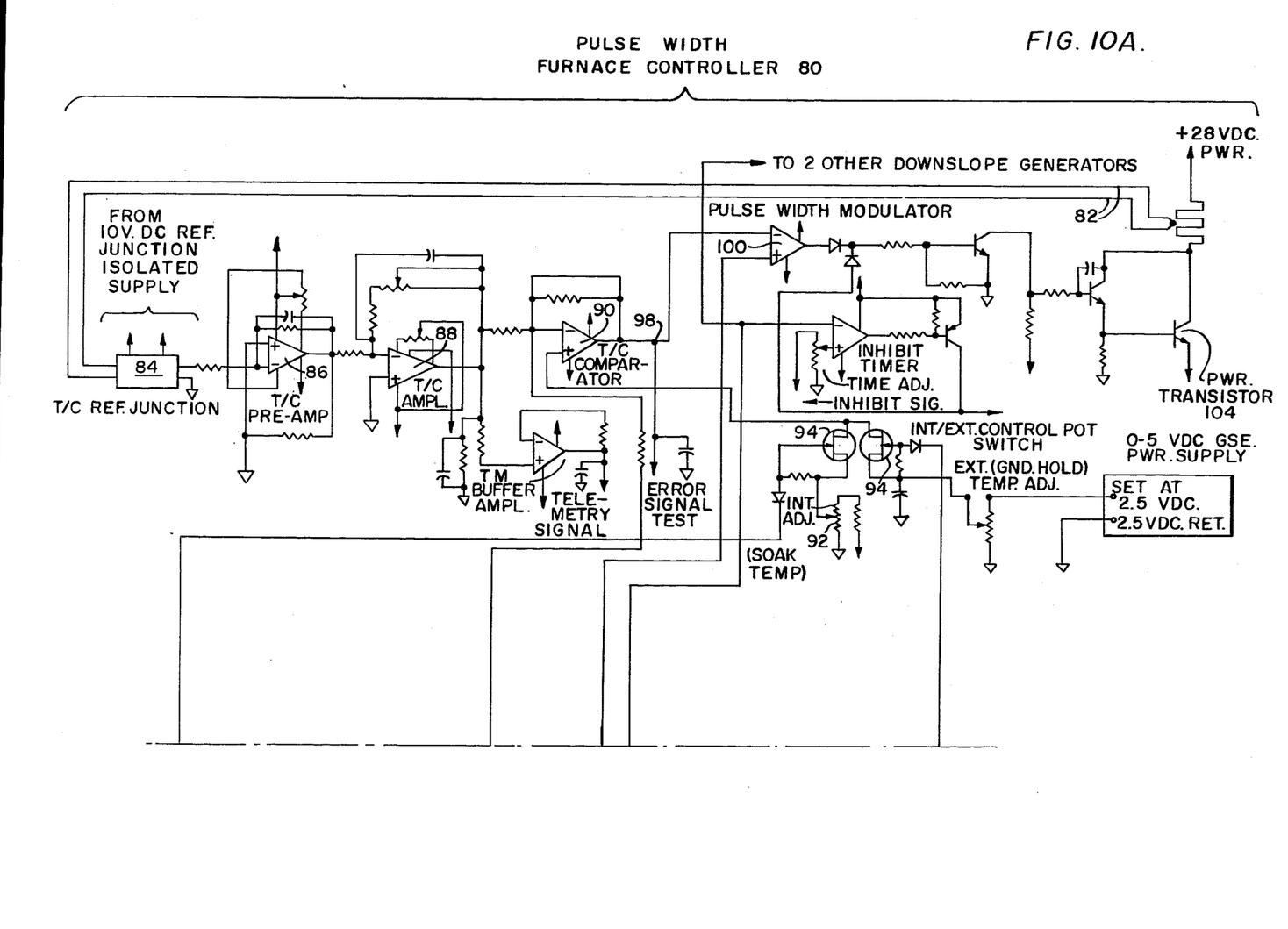
FIGS. 10A and 10B are schematic diagrams of the electrical system of the present invention.
Figure 10B:
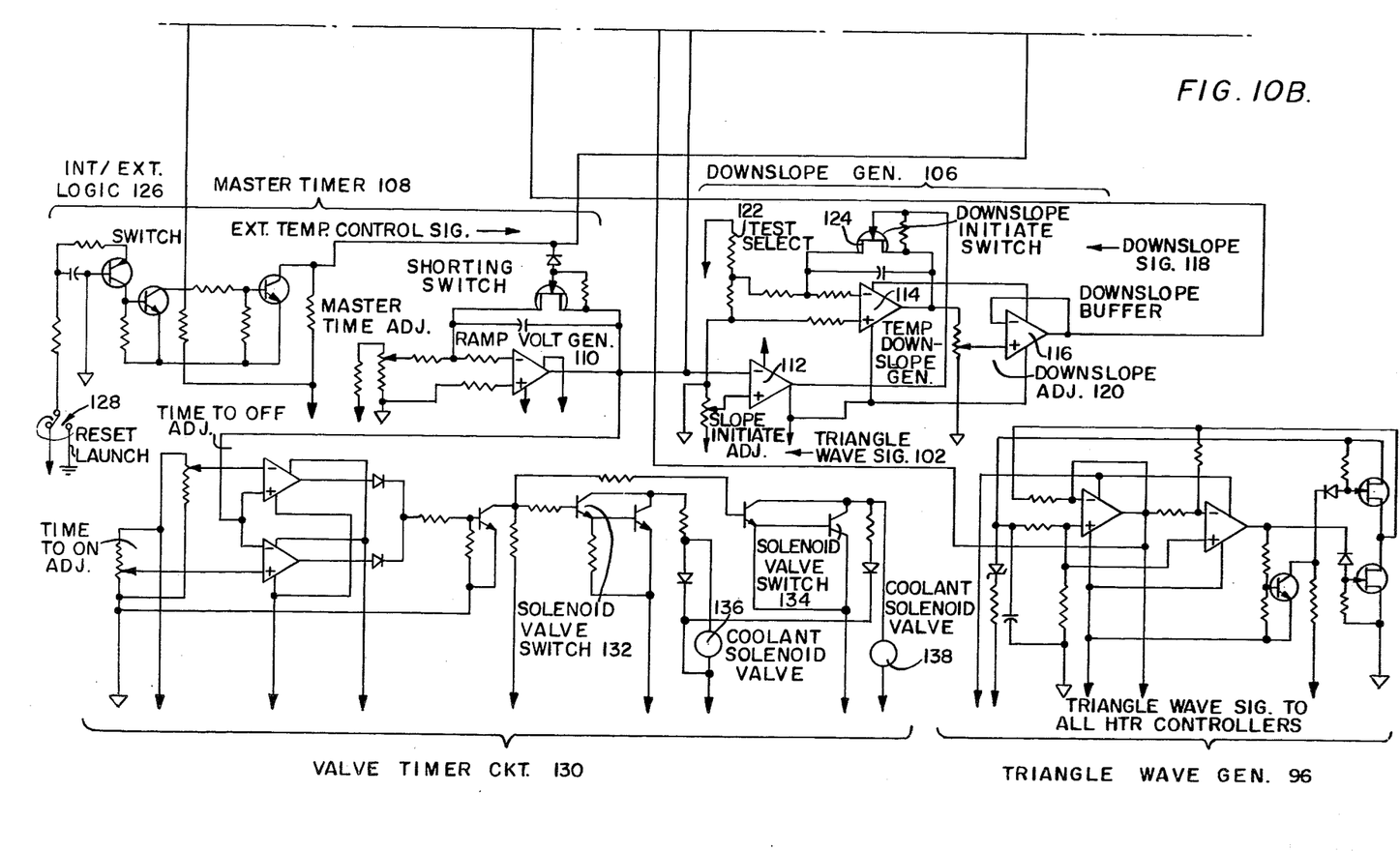
Figure 11:
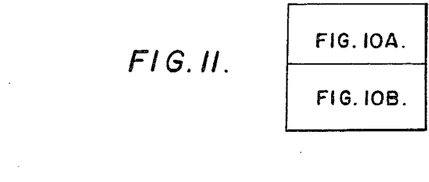
FIG. 11 shows the arrangement of FIGS. 10a and 10b.

The feedback control used to maintain exact temperature in the three zones of each heating module of the furnace is shown in FIGS. 10a and 10b. The interconnection of these circuits is shown in FIG. 11. The thermocouples 22, 24 and 26 are constructed of a chromel-alumel material for temperatures up to 1200° C. and tungsten-rhenium for temperatures up to 1600° C. and measure the temperature of each zone, then power to corresponding heaters is automatically adjusted to hold a pre-set temperature. The thermocouple amplitude and pulse width furnace controller 80 (see FIG. 10a) shows that the thermocouple voltage is connected to a reference junction 84 by means of leads 82. This voltage is amplified by high gain operational amplifiers 86 and 88, then subtracted from the adjustable voltage references corresponding to adjustable potentiometer 92 contolled by internal/external switches 94. This comparison is accomplished in a thermocouple comparator 90. The resulting error voltage 98, the difference between the desired temperature and actual temperature, regulates the power delivered to the heaters. If the temperature is low, heater power is increased, and when the temperature is high, the power is reduced. Desired temperature is programmed by setting the self-contained potentiometers 92, or, if desired, it can be remotely controlled. Analog voltage switches can select remote external references for pre-launch ground control or the internal potentiometers. Since the thermocouple amplitude and pulse width circuit 80 controls only a single thermocouple and since nine thermocouples are utilized in the present invention, it can be appreciated that nine of these circuits must be included in the control circuitry.

By changing the duty cycle, or ratio of on time to on and off time, the heater power is varied. This duty cycle is modulated by comparing the error voltage 98 with a triangular wave shape in a pulse width modulator 100. The triangular wave shape is generated by the triangle wave generator circuitry 96 (see FIG. 10b). This circuitry generates a single triangle wave used by all of the thermocouple amplitudes circuits and therefore only a single triangle wave generator is needed. When the instantaneous amplitude of the triangle wave 102 is greater than the error voltage 98, power transistors 104 (one for each of the heaters) connected to each of the heating elements are switched off. If, however, the amplitude of the triangle wave 102 is less than the error voltage 98, the power transistors are switched on, thereby supplying power to the heaters. Thus, the amount of time the heater is activated depends upon the magnitude of the error voltage. Thus, if large amounts of heat are required, the power transistors 104 are held on for the most of the cycle.

Switching the heaters on and off has several advantages over simply varying the DC voltage of the heaters. Since the power transistors 104 are either on or off, power dissipation which occurs when there is current flow through and voltage across the transistor, is avoided. The output boasts an efficiency of better than 93%. Additionally, if the voltage were varied, the power would be proportional to the square of the applied voltage resulting in a system having a non-linear gain. Since switching is done at a sufficiently fast rate of 100 Hertz, instantaneous variations in heater temperature are removed by the thermal capacitance of the furnace. The triangle wave oscillator generates the reference wave used by all the power amplifiers. This amplitude is compensated to reduce the effects of battery voltage changers on the output power.

Since it is of the utmost importance that the thermal gradient be effectively controlled, the electronic instrumentation must provide the capability of linearly reducing the temperature of each heated zone and thus move the gradient through the sample at a controlled rate. In order to accomplish this, a downslope generating circuit 106 is utilized. It should be noted that there are three downslope generating circuits in the entire system. The downslope generating circuit 106 produces a ramp function with a constant slope by utilizing a constant voltage input generated by a ramp voltage generator 110 in a master timer 108. This constant voltage is introduced to an amplifier 112 and then passes through a downslope initiate switch 124 and into an operational amplifier integrator 114. The ramp function is then attenuated to its desired value by use of the downslope adjustment 120. The signal is then sent through a downslope buffer 116 and then the downslope signal 118 is subtracted from the temperature reference signal in the thermocouple comparator 90. Therefore, a constant degree of temperature decrease results in the furnace. A test select resistor 122 is used to generate a downslope greater than 90° C./min. If the value of the test select resistor 122 is, for example, 470 K the downslope would then be 95° C./min.

The electronic system of the present invention also contains hardware control for the furnace system during prelaunch activities. This control includes an internal/external logic circuitry 126 which provides the capability for heating the experiment to the desired pre-launch temperature at various heat-up rates, and hold this temperature until lift-off. It will also provide the capability of hardwire monitoring all thermocouples and control activities.

This system also provides a single master event timer 108 referenced to lift-off, that will electrically initiate the desired processing activities throughout the flight, such as reaching and maintaining the required temperatures, holding them for a desired period of time, and lowering them linearly with time. This timing is accomplished with an integrator which is initiated as lift-off by launch switch 128 which actuates on 3G's and generates a slope whose voltage is analagous to the elapsed time. Furnace activities such as temperature soak times, cool down, valve operations, liquid and gaseous cooling and furnace shut-down are initiated when the ramp voltage generated by amplifier 110 becomes greater than the pre-set referenced voltages.

The master event timer 108 controls a valve timer 130 (having four circuits per controller system). This timer contains two solenoid valve switches 132, 134 which controls the coolants solenoid valves 136, 138 for introducing the coolant water into the heat exchanger. Gas quench valves are also sequenched by these valve timers.

This system contains the capability of monitoring nine temperatures in the range of 0°–1200° C. or 0°–1600° C. with an accuracy of ±1% of the measured value. The conditioning equipment will also be provided to insure thermocouple output compatible with electronic recording and a flight telemetry system which requires a 0–5 volt DC input.

Figure 12:
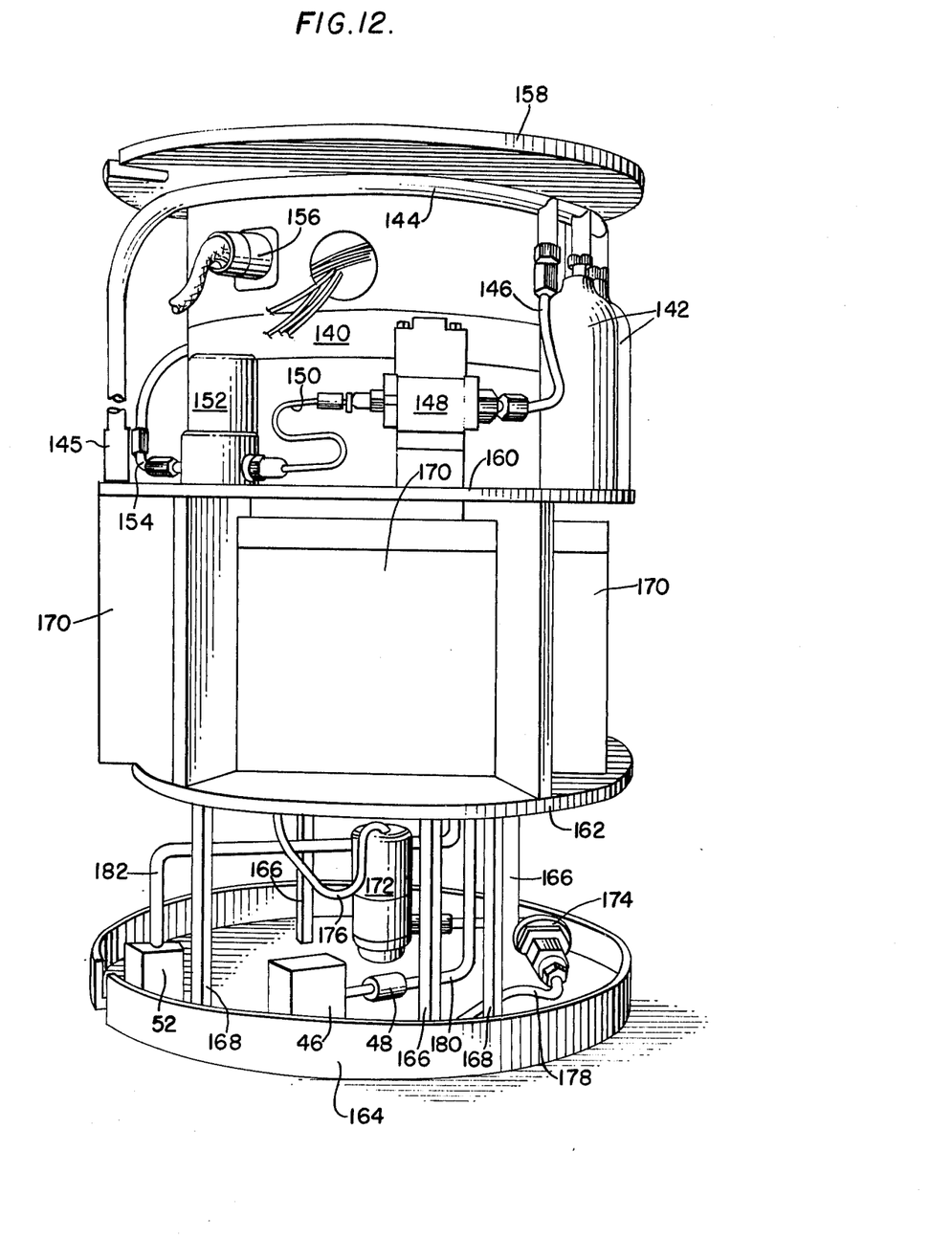
FIG. 12 is a perspective view of the space furnace.

FIG. 12 gives a perspective view of the complete general purpose rocket furnace. As shown, the furnace is substantially circular and has a diameter of about 14 inches, is 21 inches long and weighs approximately 80 pounds. The furnace contains a top support 158, a base 164 and two middle supports 160 and 162, dividing the furnace into three sections.

Gas storage cannisters 142 containing helium gas at 2000 p.s.i. encircle the majority of the rear section of the top compartment. The cannisters are supported by support 160 and supply gas to each of the heating modules through flow line 144. This line 144 is connected to a gas regulator 148 through a line 146 and in turn is connected to a gas supply solenoid valve 152 and a gas flow control orifice 154 through S-shaped tubing 150. The flow line 144 is also connected to a fill and vent valve 145 located on support plate 160. Power is supplied to the furnace through the use of power plug 156.

The middle compartment (between supports 160 and 162) contains the control instrumentation and power supply components 170 which direct and control the operation of the heating modules.

The bottom section contains a gas exit solenoid valve 172 which is connected to the bottom of each heating module through gas exit line 176. The gas flows from each heating module and passes through a non-propulsion vent and through the skin of the rocket. A pressure relief valve 174 is used to prevent pressure build-up. A water supply tank 46 solenoid valve 48, and line 180, allow water to pass to the bottom of each heating module to transfer heat from the graphite crucible. The heated water then passes through line 182 into water catch tank 52. For the sake of simplicity, only one water supply tank 46 and catch tank 52 are shown. However, it should be appreciated that there are only one supply tank and one catch tank for each heating module.

Figure 13:
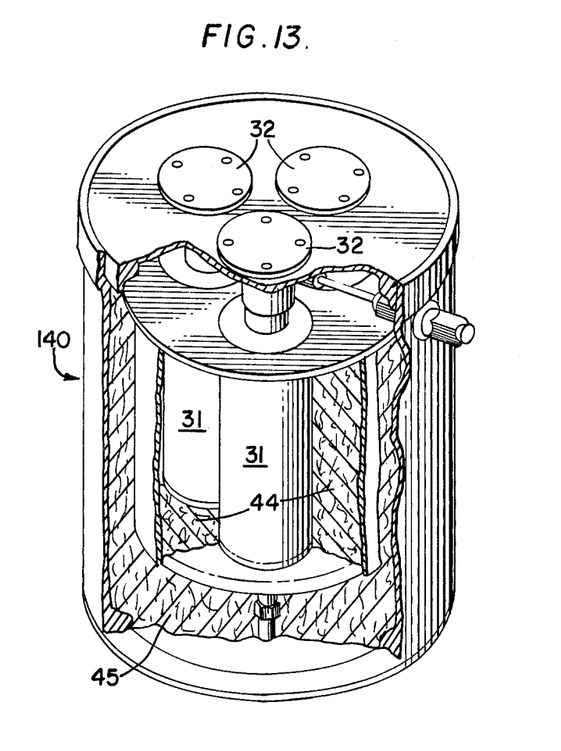
FIG. 13 is a perspective view of the heating cylinder.

Each of the heating modules 10 are contained in a cylinder 140 (see FIG. 13) extending between the top two sections of the furnace. Each module is contained in a radiation shield 30 and are separated from each module by fiberous insulation 44. Insulation 45 is also provided for insulating all of the modules from the outside environment. Supports 168 are provided for supporting circular support 162, whereas supports 166 are directly affixed to cylinder 140.

To summarize, each of the three heating modules described hereinabove will have at least one independently controlled heating element. Each of these heating elements, up to nine in all, will have the capability of operating under steady state conditions over a temperature range of room temperature to 1600° C. The mechanical and thermal design of the furnace system will be capable of withstanding the research rocket launch and recovery environments at the maximum temperatures repeatedly without significant damage. The steady state temperature fluctuations, as a result of the active temperature controller, will be held to minimum feasible limits under all operating conditions.

The furnace system of the present invention is capable of producing temperature gradients between 0° and 150° C./cm. The three temperature zones in each of the three gradient heating furnace cavities is established by independently controlled heating elements. Each heating element is capable of sustained operation at the desired processing temperatures in an inert gas atmosphere. The three zones provide a wide range of thermal gradients from an isothermal region, obtained by heating all three zones to the same temperature, to a maximum where the top and middle zones are heated to the maximum temperature and the third or cold zone is maintained at as low a temperature as possible. The three thermocouples in each heating module measure the temperature of their respective heated zone. The thermal gradients are determined by the temperature of the thermocouples and the distances they are apart.

Gradients established across the experiment samples by three heated zones are moved through the sample at controlled rates. These rates can be variable between 0° and 60° C./min. The temperature reduction rate is related to the operating temperature and the capacity of the system to remove thermal energy from the cold end of the heated module. The solidification rates are achieved by linearly reducing the temperature of each heated zone, at the same time maintaining the desired temperature gradient. The furnace temperature reduction rates are specified in °C./min. This involves actually dropping the temperature of each furnace segment a certain number of degrees over a period of time. A control solidification rate of experiment samples involves the thermal gradient as well as the temperature reduction and is specified in cm/min. This is related to the movement of the solid-liquid interface through the sample and is obtained by dividing the temperature reduction in °C./min. by the thermal gradient in °C./min.

The entire furnace is monitored and the onboard telemetry system transmits sample growth rate data and furnace performance information to ground stations allowing all furnace systems to be monitored both before launch and during flight.

While this invention has been described in great detail, it would be obvious to those skilled in the art that various changes may be made without departing from the scope of the invention, and the invention is not to be considered limited to what is shown in the drawing and described in the specification.

What is claimed is:

1. A multi-purpose rocket furnace for conducting material processing experiments in outer space environments comprising:

a heating module containing a processing cavity;

a plurality of heating elements contained in said heating module capable of heating separate sections of said processing cavity to different temperatures;

a plurality of thermocouples contained in said heating module for measuring the temperature of each of said separate sections;

comparison means connected to said thermocouples for comparing the actual temperature of said sections to a predetermined set temperature; and adjusting means connected to said comparison means and to each of said heating elements for adjusting the power received by each of said heating elements to ensure that said predetermined set temperature is maintained in each section of said processing cavity; and gas purge means associated with said module for isothermally cooling said cavity.

2. A multi-purpose rocket furnace in accordance with claim 1 wherein said purge means is a plurality of helium gas cannisters.

3. A multi-purpose furnace in accordance with claim 1 wherein each of said heating modules is encircled by a radiation shield allowing said gas to pass through the heated area.

4. A multi-purpose rocket furnace in accordance with claim 1, wherein said comparison means includes a plurality of comparators for comparing the temperature of each section of each processing cavity with a predetermined temperature represented by a voltage of an adjustable potentiometer, said comparison means producing an error voltage, wherein each adjustable potentiometer includes a single power transistor for each of said heating elements and a single triangle wave generator for the entire system, wherein when the instantaneous amplitude of a triangle wave produced by said triangle wave generator is greater than said error voltage, said power transistors are switched on, and when said amplitude is less than said error voltage, said power transistors are switched off.

5. A multi-purpose rocket furnace in accordance with claim 4 further including a downslope generating means for producing a ramp function with a constant slope for linearly reducing the temperature of each section of each processing cavity.

6. A multi-purpose rocket furnace in accordance with claim 4 wherein said potentiometers can be remotely adjusted.

7. A multi-purpose rocket furnace in accordance with claim 1, further including a timer means for establishing a predetermined sequence of events for each of the processing experiments during flight, wherein said timer means is initiated by a launch switch activated by the occurrence of a predetermined gravitational pressure.

8. A multi-purpose rocket furnace for conducting material processing experiments in outer space environments comprising:
a heating module containing a processing cavity;
a single heating element contained in said heating module;
a single thermocouple contained in said heating module for measuring the temperature of said processing cavity;
comparison means connected to said thermocouple for comparing the actual temperature of said processing cavity to a predetermined set temperature; and
adjusting means connected to said comparison means and to said heating element for adjusting the power received by said heating element to ensure that said predetermined set temperature is maintained in said processing cavity, including gas purge means in connection with said heating module for isothermally cooling said heating module.

9. A multi-purpose rocket furnace in accordance with claim 8 wherein said purge means is a plurality of helium gas cannisters.

10. A multi-purpose furnace in accordance with claim 8 wherein each of said heating modules is encircled by a radiation shield allowing said gas to pass through the heated area.

11. A multi-purpose rocket furnace in accordance with claim 8, wherein said comparison means includes a comparator for comparing the temperature in each of said processing cavities with a predetermined temperature represented by a voltage of an adjustable potentiometer, said comparison means producing an error voltage.

12. A multi-purpose rocket furnace in accordance with claim 11 wherein said adjusting means includes a single power transistor for each of said heating elements and a single triangle wave generator for the entire system, wherein when the instantaneous amplitude of a triangle wave produced by said triangle wave generator is greater than said error voltage, said power transistors are switched on, and when said amplitude is less than said error voltage, said power transistors are switched off.

13. A multi-purpose rocket furnace in accordance with claim 11 wherein said potentiometers can be remotely adjusted.

14. A multi-purpose rocket furnace in accordance with claim 8, including a downslope generating means for producing a ramp function with a constant slope, and means responsive to downslope generating means for linearly reducing the temperature of said processing cavity.

15. A multi-purpose rocket furnace in accordance with claim 8, further including a timer means for establishing a predetermined sequence of events for a processing experiment during flight, said timer means being initiated by a launch switch activated by the occurrence of a predetermined gravitational pressure.

16. A multi-purpose rocket furnace in accordance with claim 8 which operates within the range of 27-32 volts.

17. A furnace comprising:
(a) a heating module containing an elongated processing cavity that is open at one end and closed at the other end;
(b) at least two sets of heating elements associated with the module for independently heating longitudinally spaced sections of the processing cavity, at least one of the sections being adjacent the closed end thereof;
(c) means for controlling the power spplied to the heating elements such that a predetermined set temperature is maintained in each section of the cavity; and
(d) cooling means in the module for removing thermal energy from the cavity through the closed end of the module.

18. A furnace according to claim 17 including gas purge means for flushing the cavity with an inert gas to achieve a rapid isothermal cooldown of the cavity.

19. A furnace according to claim 17 wherein said cooling means includes a water supply tank supplying coolant to the interior of said heating module and a water catch tank for holding the heated coolant after it has flowed through said heating module.

20. A multi-purpose rocket furnace in accordance with claim 19 wherein said cooling means is controlled by a solenoid valve and a flow rate control orifice.

21. A multi-purpose rocket furnace in accordance with claim 19 wherein said cooling means includes a stainless steel water jacket surrounding a series of baffles, said water jacket contained within said heating module.

22. A multi-purpose rocket in accordance with claim 21 wherein said water jacket is slotted to allow for thermal expansion.

* * * * *